United States Patent [19]

Odaka et al.

[11] Patent Number: 5,379,152
[45] Date of Patent: Jan. 3, 1995

[54] DATA RECORDER WHICH PARTITIONS THE RECORDING MEDIUM INTO DATA INFORMATION AND TABLE OF CONTENTS INFORMATION

[75] Inventors: Kentaro Odaka, Tokyo; Shinya Ozaki, Kanagawa; Yoshizumi Inazawa, Kanagawa; Masaki Yamada, Kanagawa, all of Japan; Peter Bramhall, Bristol, England

[73] Assignees: Sony Corporation, Tokyo, Japan; Hewlett-Packard Limited, Wokingham, England

[21] Appl. No.: 121,664

[22] Filed: Sep. 15, 1993

Related U.S. Application Data

[63] Continuation of Ser. No. 873,583, Apr. 21, 1992, abandoned, which is a continuation of Ser. No. 442,545, Nov. 28, 1989, abandoned.

[51] Int. Cl.$^6$ .......................... G11B 5/09; G11B 15/14
[52] U.S. Cl. ........................................ 360/48; 360/53; 360/64
[58] Field of Search .................. 360/48, 32, 64, 53

[56] References Cited

U.S. PATENT DOCUMENTS

| | | | |
|---|---|---|---|
| 4,827,462 | 5/1989 | Flannagan et al. | 369/32 |
| 4,873,589 | 10/1989 | Inazawa et al. | 360/32 |
| 4,899,232 | 2/1990 | Odaka et al. | 360/48 |
| 4,958,244 | 9/1990 | Inazawa et al. | 360/74.4 |
| 5,012,459 | 4/1991 | Odaka et al. | 360/32 |
| 5,029,022 | 7/1991 | Odaka et al. | 360/48 |
| 5,067,131 | 11/1991 | Odaka et al. | 371/40.1 |
| 5,091,805 | 2/1992 | Odaka et al. | 360/53 |
| 5,134,529 | 7/1992 | Inazawa et al. | 360/48 |
| 5,144,500 | 9/1992 | Odaka et al. | 362/32 |
| 5,144,501 | 9/1992 | Inazawa et al. | 360/32 |

FOREIGN PATENT DOCUMENTS

| | | |
|---|---|---|
| 272130 | 6/1988 | European Pat. Off. |
| 1-227273 | 9/1989 | Japan . |

OTHER PUBLICATIONS

Odaka et al., "Format of Pre-Recorded R-Dat Tape and Results of High Speed Duplication", Aug. 1986, pp. 433–440.

Motoyama et al., "A Digital Audio Tape Recorder (DAT) File", Jan. 1989, pp. 77–80.

*Primary Examiner*—Donald Hajec
*Assistant Examiner*—Won Tae C. Kim
*Attorney, Agent, or Firm*—Limbach & Limbach

[57] ABSTRACT

A data recorder includes a recording unit for recording data having a predetermined data format and a frame address in a recording medium in units of frames each consisting of predetermined amount of data, and for forming a plurality of Partitions each consisting of a plurality of data areas in which different types of data are recorded during recording. The data recorder performs initialization of a length of at least one of the Partitions.

14 Claims, 6 Drawing Sheets

DATA RECORDER WHICH PARTITIONS THE RECORDING MEDIUM INTO DATA INFORMATION AND TABLE OF CONTENTS INFORMATION

This is a continuation application of co-pending application Ser. No. 07/873,583 filed on Apr. 21, 1992 abandoned, which is a continuation of application Ser. No. 07/442,545, filed Nov. 28, 1989 abandoned.

BACKGROUND OF THE INVENTION

1. Field of the Invention

The present invention relates to a data recorder which records and reproduces data sent from, e.g., a computer using a rotary head type digital audio tape recorder (DAT).

2. Description of the Prior Art

In a computer, in order to protect (back-up) data written in a hard disk or the like, these data are transferred to and recorded in a data streamer (data recorder) once a day.

As a conventional data recorder, a ¼-inch data cartridge type data recorder is often used. However, the data recorder consumes a large amount of a magnetic tape, and has a low data rate in a recording mode. Therefore, a transfer/recording operation is time-consuming. Since the data recorder cannot perform a high-speed search operation, it takes a lot of time to search a starting portion of desired data.

Figure 1:
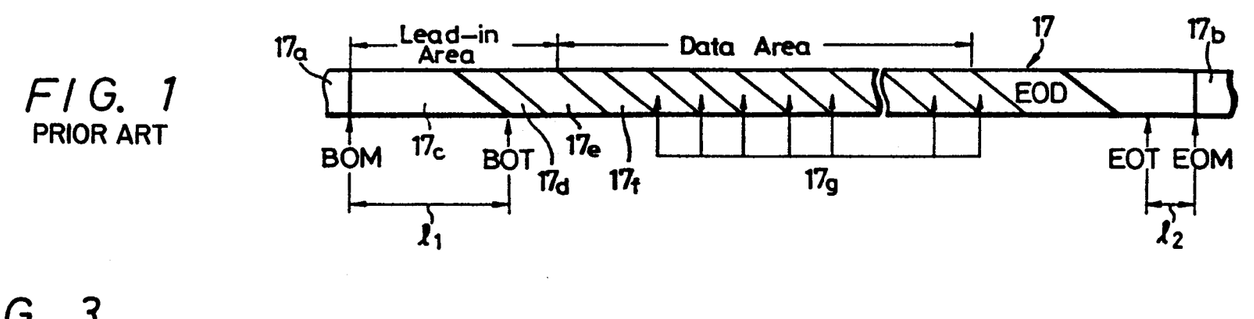
FIG. 1 is a schematic diagram showing a tape format of a conventional data recorder according to the prior art.

A digital audio tape recorder of a helical scan type using a rotary head which has been recently commercially available, a so-called DAT, is used as a data recorder. When the DAT is used as the data recorder, data from the host computer is converted into data having a DAT format and is then recorded. In the DAT format, two oblique tracks formed during one revolution of two heads having different azimuth angles are given as one frame, and 16-bit pulse code modulated (PCM) audio data is divided by half to provide two 8-bit data, which are interleaved and recorded in units of frames. In addition, sub data is recorded. In this case, as will be described later, a main area for recording PCM data and a sub area for recording sub data are formed on each track. FIG. 1 shows a tape format when a DAT is used as a data recorder.

Referring to FIG. 1, a magnetic tape 17 consists of a magnetic body portion having a total length $L_0$ (tape length), and transparent leader tape portions 17a and 17b which are connected to respective ends of the magnetic body portion. A leading end of the magnetic body portion is called a BOM (Beginning Of Media), and its ending end is called an EOM (End of Media). An EOT (End Of Tape) representing a pre-end is located at a position distant from the EOM toward the BOM by a length of $l_2$. A point located at a position distant from the BOM by a length of $l_1$ is called a BOT (Beginning Of Tape). A variety of data to be described later are recorded after the BOT. An area from the BOM to the BOT is called a device area 17c. The device area 17c is kept blank or a signal for testing an apparatus is recorded in and reproduced from the device area 17c. When a head is present in the device area 17c, a tape cassette is attached/detached or the tape 17 is loaded or unloaded. Note that the length $l_1$ is, e.g., $l_1 = 350 \pm 10$ mm and that the length $l_2$ is, e.g., $l_2 = 500$ mm ($\approx 2045$ frames). A reference area 17d of 35 frames follows the device area 17c to record therein a signal representing the starting portion of data. A system area 17e of 115 frames follows the reference area 17d to record therein history such as the number of read and write opeations, the number of errors and the like. The system area 17e is followed by an area of 23 frames called a vendor group 17f which can record therein desired data. The vendor group 17f is followed by a group area 17g in which there is recorded back-up data sent from a host computer. The group area 17g includes a plurality of groups each having 23 frames. Next to the group area 17g, an EOD (End Of Data) signal is recorded in 300 frames so that, upon reproduction, any data found to be recorded after the EOD is ignored as old data. An area from the BOM to the system area 17e is called a lead-in area, and an area including the vendor group 17f and the group area 17g is called a data area.

When the DAT is employed as the data recorder and data is recorded and reproduced according to the above-mentioned format, the contents of a table must be recorded in the tape 17 in order to know types and positions of data sent from the host computer and recorded in the tape 17. The contents of table include, e.g., a data file name, date on which data is formed, the name of a person who forms the data, brief contents of data and data address. An area in which the contents of table are recorded is called a directory area. The directory area of desired length is typically recorded in a proper position next to the BOT or recorded just before the EOD shown in FIG. 1 according to a predetermined data format.

In this case, however, a special data format for the directory area must be provided, which unavoidably causes software and hardware of the system to be considerably modified. Further, a special command signal must be prepared to make an access between a central processing unit (CPU) and the system. In addition, when the directory area is provided just before the EOD, then it takes plenty of time to read the directory area after the tape cassette is loaded on the DAT. Furthermore, there is a possibility that, during data recording, directory data recorded will be inadvertently erased by a malfunction or the like.

OBJECTS AND SUMMARY OF THE INVENTION

Accordingly, it is a general object of the present invention to provide an improved data recorder which can eliminate the defects encountered with the prior art.

More specifically, it is an object of the present invention to provide a data recorder in which a directory area can be formed by a minimal change of software and hardware.

It is another object of the present invention to provide a data recorder in which the directory area can be prevented from being erased unintentionally.

It is still another object of the present invention to provide a data recorder in which a length of the directory area is arbitrarily determined and data can be freely rewritten and added within the above-mentioned length.

It is still another object of the present invention to provide a data recorder in which a plurality of PARTITIONs are formed to have the same data format and each PARTITION can be independently accessed.

According to an aspect of the present invention, there is provided a data recorder for recording data on a recording medium according to a predetermined data recording format providing frame divisional data areas and frame addresses thereof, comprising:

means for receiving data to be recorded;

means for recording the data onto the recording medium into frames of a first partition; and means for recording onto the recording medium into frames of a second partition directory information of the data recorded in the first partition.

According to another aspect of the present invention there is provided a data recorder for recording data on a recording medium according to a predetermined data recording format providing frame divisional data areas and frame addresses thereof, comprising:

means for receiving data to be recorded;

means for recording the data onto the recording medium into frames of a first partition;

means for recording onto the recording medium into frames of a second partition directory information of the data recorded in the first partition;

means for receiving length data designating the data amount to be recorded onto the recording medium for partition initialization; and means for determining the data length of the second partition based upon the length data.

The above, and other objects, features and advantages of the present invention, will become apparent in the following detailed description of a preferred embodiment when read in conjunction with the accompanying drawings, in which like reference numerals are used to identify the same or similar parts in the several views.

DETAILED DESCRIPTION OF A PREFERRED EMBODIMENT

A data recorder according to an embodiment of the present invention will now be described in detail with reference to the drawings.

Figure 2:
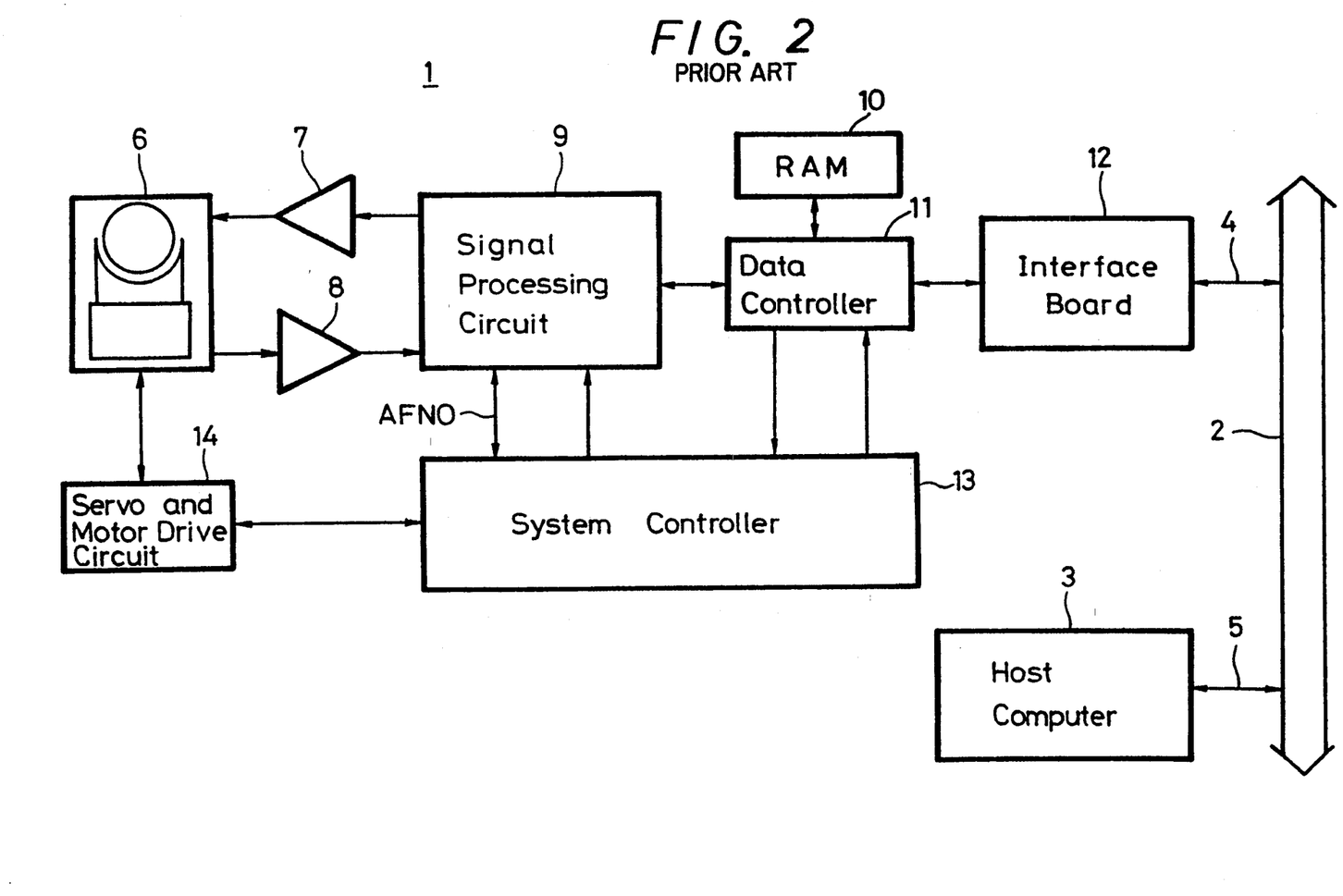
FIG. 2 is a block diagram showing an arrangement of a conventional digital tape recorder, and to which the present invention can be advantageously applied.

FIG. 2 illustrates an arrangement of a digital audio tape recorder (DAT) to which the present invention can be advantageously applied. In FIG. 2, reference numeral 1 generally designates a DAT, 2 an interface bus line, 3 a host computer and 4 and 5 inside bus lines. In FIG. 2, it will be seen that the DAT 1 is mainly comprised of a recording/reproducing section 6, a recording amplifier 7, a playback amplifier 8, a signal processing circuit 9, a random access memory (RAM) 10, a data controller 11, an interface board 12, a system controller 13, a servo and motor drive circuit 14 and the like.

The system controller 13, the signal processing circuit 9 and the data controller 11 are arranged such that they may exchange predetermined signals, such as, an absolute frame number AFNO (to be explained later) one another.

The recording/reproducing section 6 is provided with a rotary head drum, though not shown. A magnetic tape is wound around the rotary head drum over an angular extent of about 90 degrees and is transported by a capstan. The rotary head drum is provided with two recording heads A and B having different azimuth angles, and two reproducing heads A' and B' having different azimuth angles. During one revolution of the drum, the signal is recorded on the tape as two oblique tracks by the recording heads A and B, and the recorded signal is reproduced from the tape by the reproducing heads A' and B'.

Digital data supplied from the host computer 3 through the bus lines 5, 2 and 4 are inputted to the interface board 12, and are then processed by the data controller 11, the random access memory (RAM) 10 and the signal processing circuit 9 in a predetermined manner in accordance with the commands from the system controller 13. In this manner, the digital data is converted to the above-mentioned DAT format. The converted signal is supplied to the recording/reproducing section 6 through the recording amplifier 7, and is then recorded on the magnetic tape by the recording heads A and B.

The signal recorded on the magnetic tape is reproduced by the reproducing heads A' and B'. The reproduced signal is supplied through the playback amplifier 8 to the signal processing circuit 9. Digital data, which results from re-converting the reproduced signal by the signal processing circuit 9, is supplied to the host computer 3 through the data controller 11, the interface board 12 and the bus lines 4, 2 and 5.

Figure 3:
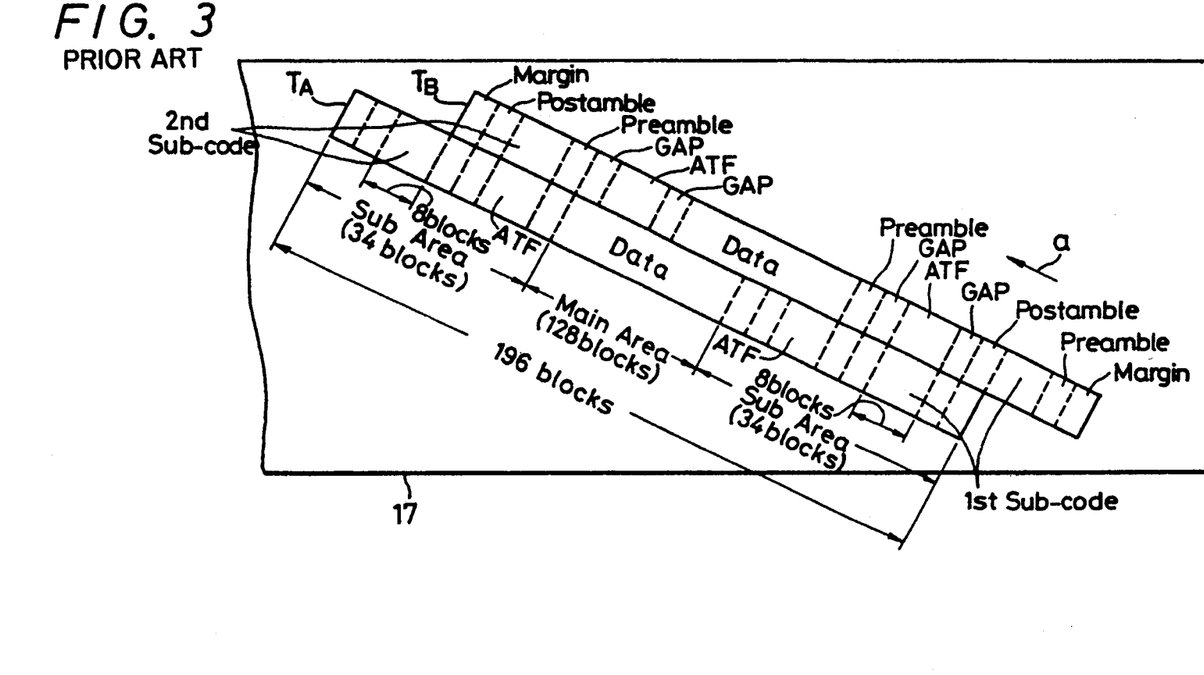
FIG. 3 is a schematic diagram showing a data format of a conventional digital tape recorder.

In the above-mentioned apparatus, the DAT format on the magnetic tape is represented as shown in FIG. 3.

In FIG. 3, it will be seen that, during one revolution of the recording heads A and B, two oblique tracks $T_A$ and $T_B$ are formed on the tape 17 as though coming from the underside of the sheet of drawing as indicated by an arrow a. The two tracks $T_A$ and $T_B$ constitute one frame. The track $T_A$ (or $T_B$) consists of 196 blocks, and one block consists of 288 bits. 34 blocks at each end portion serve as a sub area, and 128 central blocks serve as a main area.

Each sub area is further divided to provide some sections. More specifically, there are provided, from the lower end of the track, a margin section, a PLL (phase locked loop) preamble section of a sub code, a first sub-code section, a postamble section, a gap section between adjacent blocks, an automatic track following (ATF) signal section, a gap section between adjacent blocks, a PLL preamble section of data, main data area section, a gap section between adjacent blocks, an AFT signal section, a gap section between adjacent blocks, a PLL preamble section of a sub code, a second sub-code section, a postamble section, and a margin section. Each of the first and second sub-code sections is constituted by 8 blocks, and other blocks are constituted by a predetermined number of blocks, respectively. Note that in FIG. 3, the measure of lengths of sections is not accurate.

Figure 4:
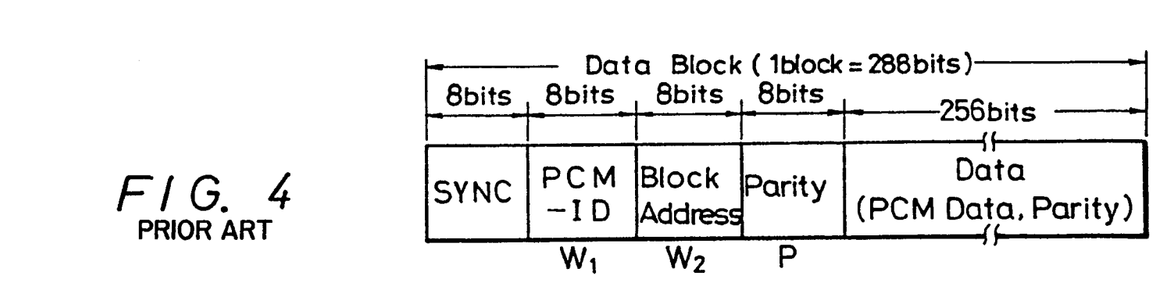
FIG. 4 is a schematic diagram showing a conventional data format of a main data block.

The main area consists of 128 data blocks. As shown in FIG. 4, each block is constituted by an 8-bit sync. (synchronizing) signal, an 8-bit PCM-ID ($W_1$), and 8-bit block address ($W_2$) and an 8-bit parity, and main data is stored in the following 256-bit section. The main data is 16-bit PCM data for L (left) and R (right) channels when an audio signal is processed. The 16-bit main data is divided to provide two 8-bit main data which are interleaved in the main areas of the slant tracks $T_A$ and $T_B$ (one frame) together with the parity. When the DAT is used as a data recorder, the data sent from the host computer 3 are processed as the main data in the same fashion. These data are formatted as shown in FIG. 4, and are recorded in the one-frame main area.

Data formats in the first and second sub-code sections in the sub area of FIG. 3 will be described.

Each of the first and second sub-code sections consists of 8 sub-code blocks, and can record 2048-bit data.

Figure 5A:
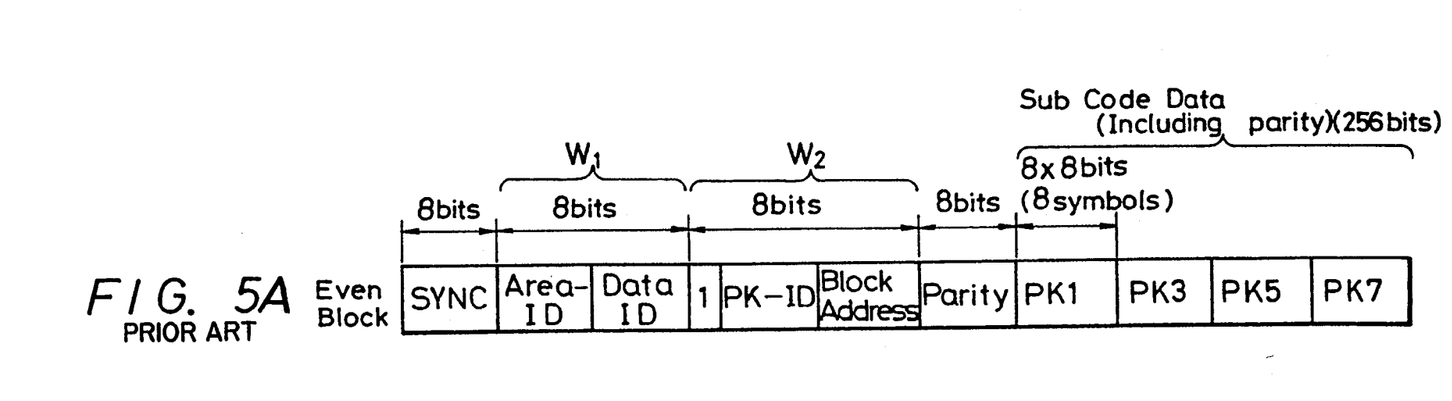
FIGS. 5A and 5B are schematic diagrams showing a conventional data block of a sub-code block, respectively.
Figure 5B:
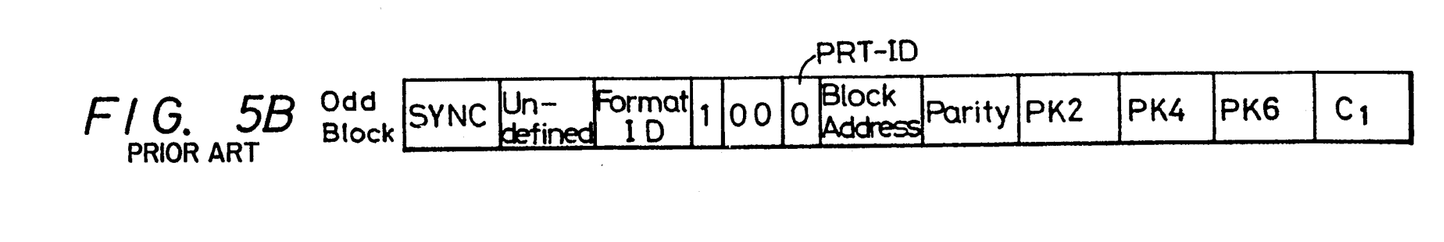

FIGS. 5A and 5B show a data format of each sub-code block. After the 8-bit sync. signal, $W_1$ and $W_2$ sections, and parity are stored, and 256-bit sub-code data including a parity is stored. The sub-code data consists of 4 packs, each consisting of $8 \times 8$ bits (8 symbols).

The blocks having EVEN and ODD block addresses have different contents of $W_1$ and $W_2$. Pack numbers (1 to 7) are provided over the EVEN and ODD blocks, as shown in FIG. 5. An 8th pack is provided with a $C_1$ code for error detection.

The $W_1$ section of the EVEN block consists of a 4-bit area ID and a 4-bit data ID, and the $W_2$ section thereof consists of upper one bit "1", a 3-bit pack ID, and a 4-bit block address. The $W_1$ section in the ODD block consists of a 4-bit undefined portion, and a 4-bit format ID, and the $W_2$ section thereof consists of upper one bit "1", a 3-bit all "0" code, and a 4-bit block address. Of the 3-bit all "0" code, the lowest one bit is used as PRT-ID representing a PARTITION number concerning the present invention.

Figure 6:
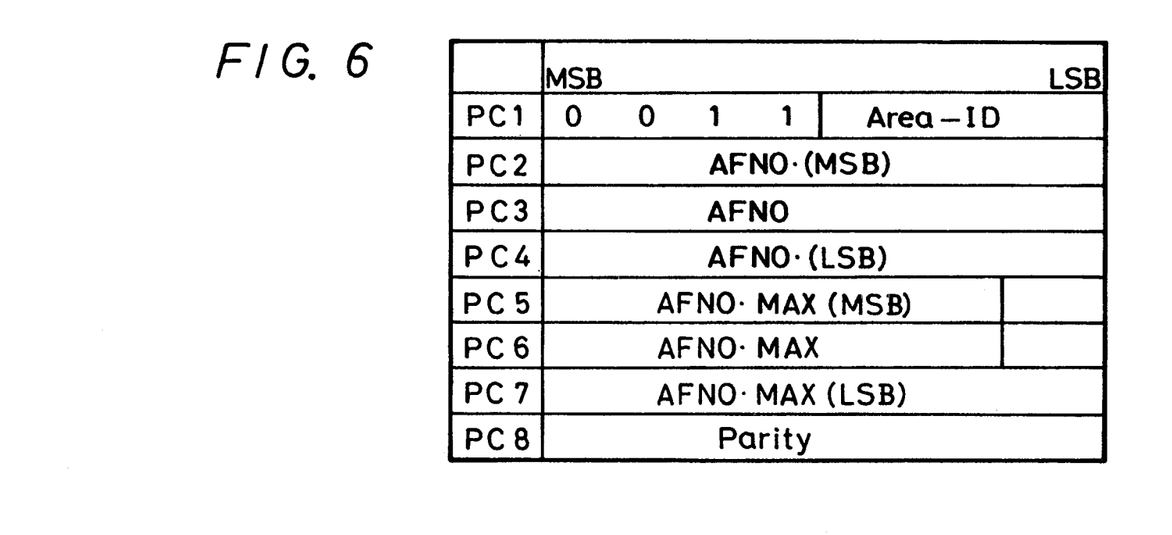
FIG. 6 is a schematic diagram of a data format of a pack of the sub-code block.

As shown in FIG. 6, the pack item "3" consists of eight 8-bit words PC1 to PC8. Upper four bits of the word PC1 are assigned to a pack item number (in this case, "0011" indicating the pack item "3"). Lower four bits of the word PC1 are assigned to an area-ID indicating each area to be described later in FIG. 7. The absolute frame number AFNO is represented by a total of 24 bits of the words PC2, PC3 and PC4. The AFNO is a successive number assigned to all frames recorded in a PARTITION on a roll of a tape. An AFNO·MAX which represents the number of frames constituting the PARTITION to be described later by the AFNO is provided by a total of 24 bits of the words PC5, PC6 and PC7. The word PC8 has a parity with respect to the words PC1 to PC7.

Figure 7:
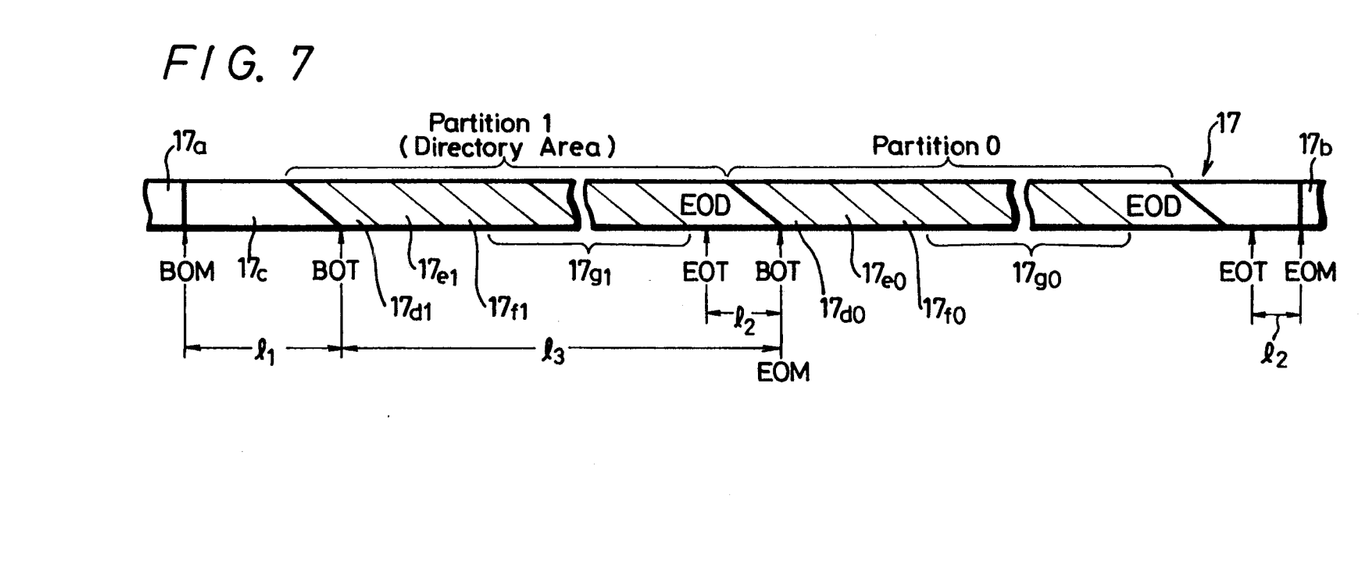
FIG. 7 is a schematic diagram showing a tape format of the data recorder according to the present invention.

FIG. 7 shows a tape format when a directory area is provided in accordance with the present invention. In FIG. 7, the same parts as shown in FIG. 1 are denoted by the same reference numerals.

The present invention introduces a novel concept called "PARTITION". PARTITION 1 and PARTITION 0 are provided next to the device area 17c. A data format of each of the PARTITIONs 1 and 0 is the same as the data format from the BOT to the end of the EOM in FIG. 1. Reference numerals $17d$ to $17d$ in FIG. 1 correspond to reference numerals $17_{d1}$ to $17_{g1}$ and $17_{d0}$ to $17_{g0}$ in FIG. 7. In the present invention, the PARTITION 1 is used as the directory area. Directory data is recorded in the group section $17_{g1}$, and the same data as in the sections $17d$ to $17g$ in FIG. 1 are recorded in the sections $17_{d0}$ to $17_{g0}$ of the PARTITION 0. Therefore, the top of each of the PARTITIONs 1 and 0 is the BOT.

Figure 8A:
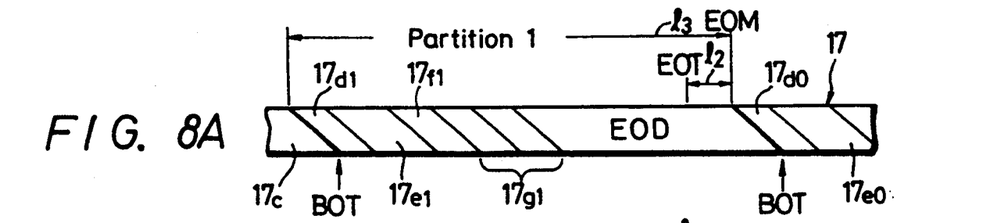
FIGS. 8A to 8C are schematic diagrams of a tape format of the invention, and to which reference will be made in explaining the changes in the tape format when data is rewritten or added, respectively.
Figure 8B:
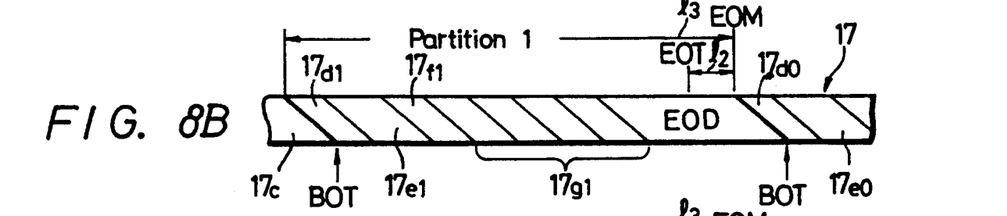
Figure 8C:
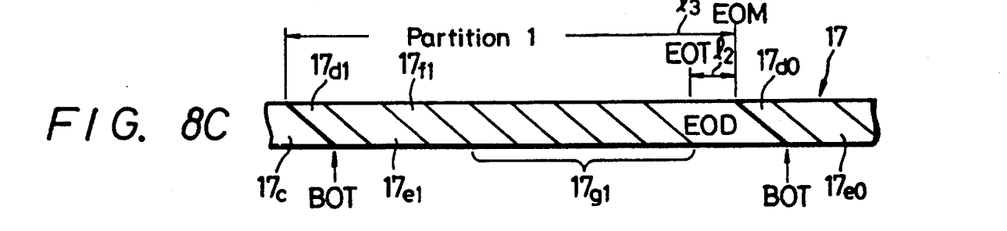

A length $l_3$ of the PARTITION 1 serving as the directory area can be arbitrarily determined by initialization. Within the length $l_3$, the directory data to be recorded in the group section $17_{g1}$ can be freely rewritten and added as shown in FIGS. 8A, 8B and 8C. That is, data recorded in two groups of the group section $17_{g1}$ as shown in FIG. 8A can be rewritten or added in four or five groups as shown in FIGS. 8B or 8C. The PARTITION number representing the PARTITION 1 or 0 is recorded as a 1-bit PRT-ID as shown in FIG. 5B. The AFNO·MAX which represents the number of frames corresponding to the initialized length $l_3$ as a maximum value of the absolute frame number AFNO is recorded in the words PC5, PC6 and PC7 of 24 bits as shown in FIG. 6. The AFNO·MAX is recorded in the system area $17_{e1}$ of the PARTITION 1.

A method of determining the length $l_3$ of the PARTITION 1 will be described below.

The length $l_3$ is determined in accordance with an amount of data written in the areas $17_{g1}$. The amount of data is designated by, for example, the host computer. The length $l_3$ is actually given by the following equation (1) as the number of frames F corresponding to the length $l_3$:

$$F = R + S + V + G[k \cdot U(1+\alpha)(1+\beta)] + B + E \qquad (1)$$

In the equation (1), R is the length, in frames, of the reference area (in the present case, 35 frames), S is the length, in frames, of the system area (in the present case, 115 frames), and V is the length, in frames, of the vendor group (in the present case, 23 frames). G is the group number which results from dividing required data capacity A, instructed by the host computer, by data amount (in the present case, 126.5 kB) of one group with the remainder raised. B is the length, in frames, of EOD (in the present case, 300 frames), and E is the length, in frames, between EOT and EOM (in the present case, 2045 frames).

k is the multiple when data is written a plurality of times. That is, in a data recorder, the same data is sometimes successively written in a plurality of frames in order to safely protect the data. In this case, k changes into 2, 3, ..., n in accordance with whether the data is to be written twice, three times, ..., n times. U is the frame number of one group (in the present case, 23 frames).

$\alpha$ is called a read after write margin. When the DAT is used as a data recorder, immediately after data is recorded in one frame upon recording, the frame is read back to check whether the recorded data is correct. For this reason, four rotary heads arranged at intervals of, e.g., 90 degrees are used. If an error is detected in the recorded data, the same data is immediately recorded in another frame and data recording then continues in sequence from that point. In this case, the frame or frames written to the tape while the read-back data was checked for errors become useless. The $\alpha$ represents a total number of useless frames of one tape and is given as follows:

$$\alpha = (l + 1)\frac{P}{1 + P} \qquad (2)$$

where l is the number of frames which are rendered useless upon an error of data recorded in one frame being detected and the frame being rewritten, numeral 1 of l+1 represents the one frame in which an error of the data is found, and P is the generation rate of data errors in one tape.

In the equation (1), $\beta$ is called a margin for pause. In a data recorder, if a transfer speed of data sent from the host computer to the data recorder is lower than a recording speed of the data, data is sometimes not present in a buffer memory. In this case, the data recorder is paused until data is stored in the buffer memory. When data is stored, a pause is released, and the data is recorded. In this case, several frames become useless after the pause is released and before the data is actually written. The $\beta$ represents a total number of useless frames in one tape and is given by the following equation (3):

$$\beta = \frac{m \times b}{N \times T} \qquad (3)$$

where m is the number of pauses generated in one tape, b is the number of frames which become useless in one pause release, N is the rotational speed of the heads A and B, and T is the duration of one tape.

In the above equation (1), when the host computer requests a data amount of A=1 MB, the length $l_3$ of the PARTITION 1, i.e., the number of frames F is calculated as follows. In this case, G becomes 8 (1000/126.5≈8), and assume that the data is to be written twice (k=2), and that in the equation (2), l=5 and P=1%. In addition, assume that in the equation (3), m=2,000, b=35, N=2,000 r.p.m., and T=120 min. Therefore:

$$\alpha = (5 + 1)\frac{0.01}{1 - 0.01} \approx 0.06$$

$$\beta = \frac{2000 \times 35}{2000 \times 120} \approx 0.3$$

$$(1 + \alpha)(1 + \beta) \approx 1.37$$

$$\therefore F = 35 + 115 + 23 + 8 \times 2 \times 23 \times 1.37 + 300 + 2045 \approx 3023 \text{ frames}$$

Figure 9:
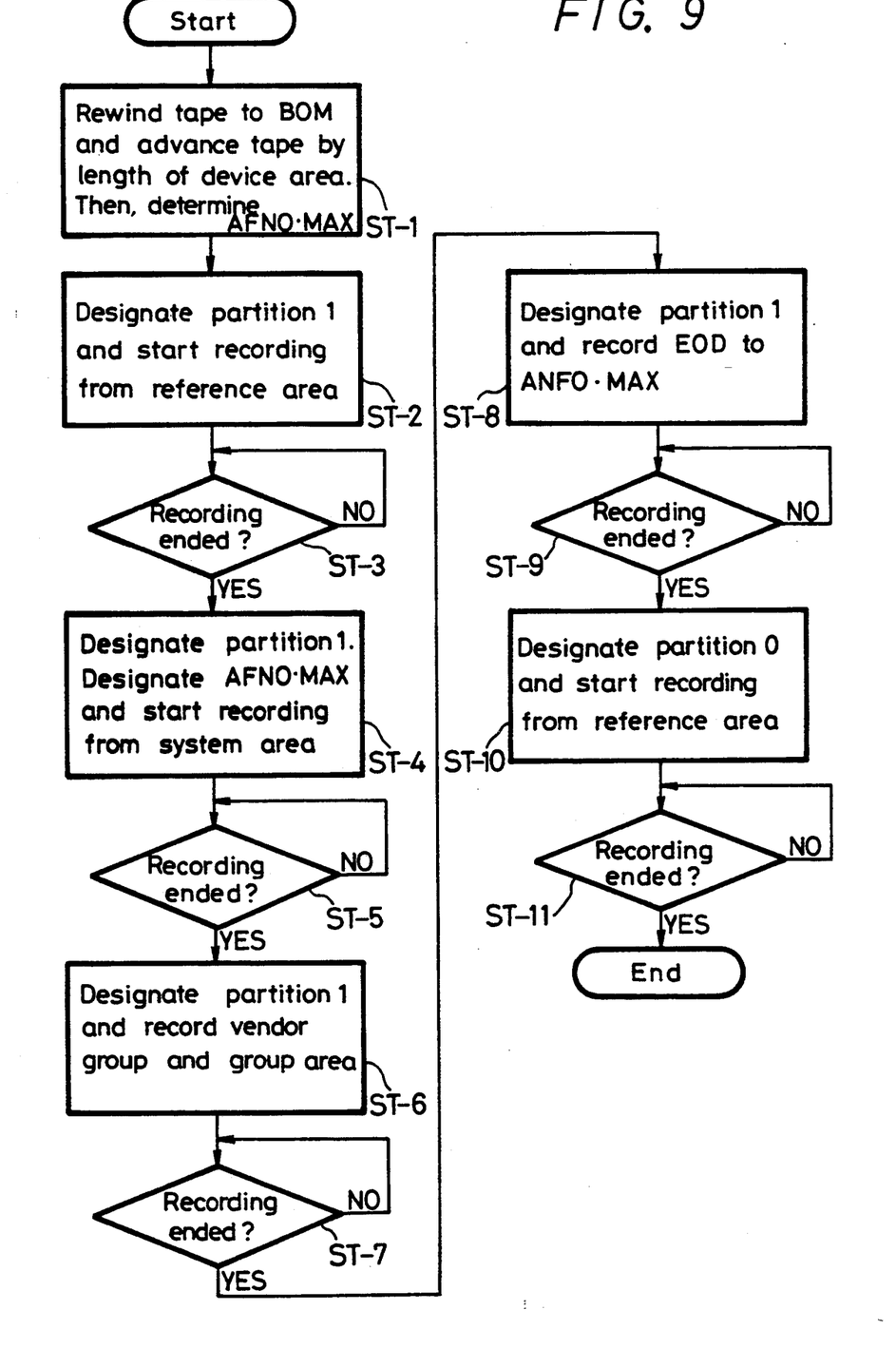
FIG. 9 is a flow chart to which reference will be made in explaining the steps involved in executing initialization of PARTITION 1.

In this manner, the number of frames F of the PARTITION 1 is determined as F=3023, and the initialization is effected in accordance with the flow chart of FIG. 9.

In FIG. 9, in step ST-1, a tape is rewound to the BOM and then advanced by the length of the device area and stopped at the BOT. Then, the AFNO·MAX is obtained in accordance with the designated number of frames F. In the embodiment shown in FIG. 7, the number of frames F corresponding to the length $l_3$ of the PARTITION 1 is the AFNO·MAX. In step ST-2, the PARTITION 1 is designated to start recording from the reference area $17_{d1}$. During this recording, in step ST-3, the AFNO of each frame is monitored, thereby detecting the end of recording in the reference area $17_{dl}$. If recording in the reference area $17_{dl}$ is ended, in step ST-4, the PARTITION 1 and the AFNO·MAX are designated, and then recording is performed in the system area $17_{el}$. Then, in step ST-5, the AFNO is monitored. If recording in the system area $17_{el}$ is ended, the PARTITION 1 is designated in step ST-6, and then the vendor group and the group area formed of at least 23 amble frames are recorded. If recording of the vendor group and the group area is ended, the PARTITION 1 is designated in step ST-7, and then the EOD is recorded to the AFNO·MAX in step ST-8. If AFNO=AFNO·MAX in step ST-9, the next PARTITION 0 is designated and recording is performed in the reference area $17_{d0}$ in step ST-10. Then, in step ST-11, the AFNO is monitored, and the end of recording in the reference area $17_{d0}$ is detected, thereby finishing the routine. After the above-mentioned steps are performed as a routine required for initialization, recording in the system area $17_{e0}$ of the PARTITION 0 may be subsequently performed.

When initialization is performed as described above, no directory data is recorded in the group section $17_{g0}$, and therefore the group section $17_{g0}$ is not formed.

An operation for recording the directory data in the group section $17_{gl}$ after initialization has been performed will be described below with reference to a flow chart forming FIG. 10.

Figure 10:
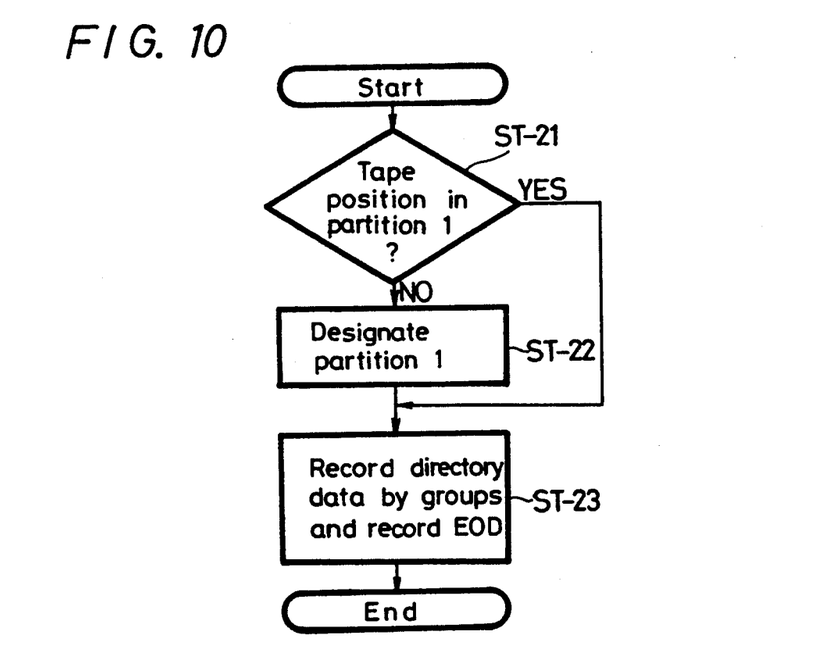
FIG. 10 is a flow chart to which reference will be made in explaining the steps involved in recording the directory data in the PARTITION 1.

Referring to FIG. 10, following the Start of operation, in decision step ST-21, it is determined whether or not a current position of a tape is present at the PARTITION 1. If a YES is outputted in step ST-21, the flow proceeds to step ST-23. If on the other hand a NO is an answer in step ST-21, then the flow proceeds to the next step ST-22 to position to the PARTITION 1 and then advances to step ST-23. In step ST-23, the directory data is written in the group section $17_{gl}$ in units of groups of 23 frames, and the EOD is written in 300 frames, thereby completing the operation. While recording is performed in step ST-23, the AFNO is monitored.

Alternatively, the directory data may be recorded in the PARTITION 1 of a tape in which initialization has been performed by other data recorder. In this case, the tape speeds of data recorders are different (e.g., in a range of ±0.5%) so that EOM is determined to be a value smaller than AFNO·MAX by 1%, i.e., AFNO·MAX (1−0.01). If AFNO·MAX (1−0.01) is obtained, this is acknowledged, and the recording operation is stopped. If AFNO·MAX (1−0.01) −2045 is obtained before the EOM, then data indicating the presence of EOT is supplied to the host computer. Thus, regardless of the difference in the tape speeds of the data recorders, data recorded in the PARTITION 0 can be prevented from being erased while data is recorded in the PARTITION 1.

In order to perform recording in the PARTITION 0, the current position of the tape is checked as in the operation of FIG. 10. After the tape is positioned at the PARTITION 0, appropriate data is written in the system area $17_{e0}$. Then, data from the host computer is written in the group section $17_{g0}$ in units of groups, and the EOD is written in 300 frames, thereby completing the operation.

In order to reproduce the data recorded in the PARTITION 1 or 0, the current position of the tape is checked, and then data recorded in the desired PARTITION is reproduced in units of groups.

In the above-mentioned embodiment, two PARTITIONs 1 and 0 are formed. However, three or more PARTITIONs may be formed. In this case, n independent PARTITIONs can be formed in one tape so as to be accessed independently from each other. In addition, the PRT-ID in FIG. 5 requires two or more bits. It is a matter of course that the directory area need not be formed.

In the embodiment shown in FIG. 7, since the directory area is formed at the start position of the tape, the directory data can be read out immediately after a tape cassette is mounted. Since the directory area has completely the same data format as that of the PARTITION 0, the directory area and the PARTITION 0 can be accessed by substantially conventional hardware and software. Therefore, the system design is almost not changed. In addition, the directory data is not inadvertently erased during recording.

Furthermore, the length $l_3$ (number of frames F) can be freely determined during initialization, and data can be freely rewritten or added within the range of $l_3$. After a tape cassette is mounted, the system area $17_{el}$ of the directory area is read. In this case, the AFNO·MAX corresponding to $l_3$ is recorded in the system area $17_{el}$. Therefore, by monitoring the AFNO·MAX, data can be rewritten or added within the range of $l_3$ without departing from this range. That is, a special signal for detecting whether the data falls outside the range of $l_3$ is not necessary.

Having described a preferred embodiment of the invention in detail with reference to the accompanying drawings, it is to be understood that the invention is not limited to that precise embodiment and that many changes and modifications could be effected by one skilled in the art without departing from the spirit and scope of the invention as defined in the appended claims.

We claim as our invention:

1. A data recorder for recording data on a recording medium according to a predetermined data recording format providing frame divisional data areas and frame addresses thereof, comprising:
   means for receiving data to be recorded;
   means for recording the data onto the recording medium into frames of a first partition;
   means for producing and recording onto the recording medium into frames of a second partition directory information of the data recorded in the first partition;
   means for receiving length data designating an amount of data to be recorded onto the recording medium for initialization of the second partition; and
   means supplied with the received length data for initializing the second partition to have a data length based upon the length data.

2. A data recorder according to claim 1, further comprising:
   means for recording a signal representing a length of the second partition in a predetermined data area of the recording medium.

3. A data recorder according to claim 1, further comprising:
   means for immediately playing back data which is recorded onto the medium, checking for errors, and rerecording the same data in a different data area of the first partition of the recording medium when the immediately played back data is determined to have been recorded with an error.

4. A data recorder for recording data on a recording medium according to a predetermined data recording format providing frame divisional data areas and frame addresses thereof, comprising:
   means for receiving data to be recorded;
   means for recording the data onto the recording medium into frames of a first partition;
   means for producing and recording onto the recording medium into frames of a second partition directory information of the data recorded in the first partition;
   means for receiving length data designating an amount of data to be recorded onto the recording medium for initialization of the second partition;
   means supplied with the received length data for initializing the second partition to have a data length based upon the length data;
   means for immediately playing back data which is recorded onto the medium, checking for errors, and rerecording the same data in a different data area of the first partition of the recording medium when the immediately played back data is determined to have been recorded with an error; and
   wherein the received length data comprises G, which is a number of groups of data to be recorded in a partition, k, which is the multiple when data is recorded on the recording medium a plurality of times, U, which is the frame number of one group, $\alpha$, which is a read after write margin and $\beta$, which is a margin for pauses, and wherein the means for initializing the length of the second partition calculates the length of the second partition based on G.

5. A data recorder according to claim 4, wherein the $\alpha$ is $$(l + 1)\frac{P}{1 + P},$$

where l is the number of frames which are rendered useless upon an error of data recorded in one frame being detected and the frame rerecorded on the recording medium and P is a generation rate of data errors in one tape, and the $\beta$ is $$\frac{m \times b}{N \times T},$$

where m is the number of pauses generated in one tape, b is the number of frames which become useless in one pause release, N is the rotational speeds of recording heads, and T is the duration of one tape.

6. A method for recording data on a recording medium according to a predetermined data recording format providing frame divisional data areas and frame addresses thereof, comprising the steps of:
   receiving data to be recorded;
   recording the data onto the recording medium into frames of a first partition;
   producing and recording onto the recording medium into frames of a second partition directory information of the data recorded in the first partition;
   receiving length data designating an amount of data to be recorded onto the recording medium for initialization of the second partition; and
   initializing the second partition to have a data length based upon the received length data.

7. A method according to claim 6, further comprising the step of:

recording a signal representing a length of the second partition in a predetermined data area of the recording medium.

8. A method according to claim 6, further comprising the steps of:

immediately playing back data which is recorded onto the medium, checking for errors, and rerecording the same data in a different data area of the first partition of the recording medium when the immediately played back data is determined to have been recorded with an error.

9. A method for recording data on a recording medium according to a predetermined data recording format providing frame divisional data areas and frame addresses thereof, comprising the steps of:

receiving data to be recorded;
recording the data onto the recording medium into frames of a first partition;
producing and recording onto the recording medium into frames of a second partition directory information of the data recorded in the first partition;
receiving length data designating an amount of data to be recorded onto the recording medium for initialization of the second partition;
initializing the second partition to have a data length based upon the received length data;
immediately playing back data which is recorded onto the medium, checking for errors, and rerecording the same data in a different data area of the first partition of the recording medium when the immediately played back data is determined to have been recorded with an error; and
wherein the step of initializing the length of the second partition is based on G where G is a number of groups of data to be recorded in a partition, k is the mutiple when data is recorded on the recording medium a plurality of times, U is the frame number of one group, $\alpha$ is the read after write margin and $\beta$ is the margin for pauses.

10. A data recording method according to claim 9, wherein the $\alpha$ is $$(l + 1)\frac{P}{1 + P},$$

where l is the number of frames which are rendered useless upon an error of data recorded in one frame being detected and the frame rerecorded on the recording medium and P is the generation rate of data errors in one tape, and the $\beta$ is $$\frac{m \times b}{N \times T},$$

where m is the number of pauses generated in one tape, b is the number of frames which become useless in one pause release, N is the rotational speeds of recording heads, and T is the duration of one tape.

11. A digital data signal recorder of the type having a rotary head means for forming oblique tracks on a recording medium, means for transporting the recording medium past the rotary head means, and signal control and processing circuitry for controlling the medium transporting means and supplying the digital signal to the rotary head means, wherein the improvement resides in the signal control and processing circuitry which includes:

means for receiving data to be recorded;
means for causing the rotary head means to record the data onto the recording medium into frames of a first partition and to generate and record directory information of the data recorded in the first partition onto the recording medium into frames of a second partition having a predetermined, maximum data length;
means for receiving length data designating an amount of data to be recorded onto the recording medium for initialization of the second partition; and
means supplied with the received length data for initializing the second partition to have a maximum data length based upon the length data.

12. A data recorder for recording data on a recording medium according to a predetermined data recording format providing frame divisional data areas and frame addresses thereof, comprising:

means for receiving data to be recorded;
means for recording the data onto the recording medium into frames of a first partition and for generating and recording directory information of the data recorded in the first partition into frames of a second partition, the means for recording further forming in each of the first and second partitions a beginning of tape mark, a reference area in which is recorded a signal representing a starting point of recorded data, a group area, and an end of data mark;
means for receiving length data designating an amount of data to be recorded onto the recording medium for initialization of the second partition; and
means supplied with the received length data for initializing the second partition to have a data length based upon the length data.

13. A data recorder according to claim 12, further comprising:

means for recording a signal representing a length of the second partition in a predetermined data area of the recording medium.

14. A data recorder according to claim 12, further comprising:

means for immediately playing back data which is recorded onto the medium, checking for errors, and rerecording the same data in a different data area of the first partition of the recording medium when the immediately played back data is determined to have been recorded with an error.

* * * * *